(12) United States Patent
Bae

(10) Patent No.: US 10,728,591 B2
(45) Date of Patent: *Jul. 28, 2020

(54) METHOD OF CONFIGURING AND TRANSMITTING AN MMT TRANSPORT PACKET

(71) Applicant: Electronics and Telecommunications Research Institute, Daejeon (KR)

(72) Inventor: Seong Jun Bae, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/232,891

(22) Filed: Dec. 26, 2018

(65) Prior Publication Data

US 2019/0132623 A1    May 2, 2019

Related U.S. Application Data

(63) Continuation of application No. 15/069,549, filed on Mar. 14, 2016, now Pat. No. 10,205,979, which is a
(Continued)

(30) Foreign Application Priority Data

Oct. 13, 2011 (KR) ........................ 10-2011-0104858
Oct. 12, 2012 (KR) ........................ 10-2012-0113533

(51) Int. Cl.
*H04N 21/236* (2011.01)
*H04L 12/18* (2006.01)
(Continued)

(52) U.S. Cl.
CPC ... *H04N 21/23605* (2013.01); *H04L 12/1868* (2013.01); *H04L 12/1895* (2013.01);
(Continued)

(58) Field of Classification Search
CPC ... H04N 21/236; H04N 21/234; H04N 21/463
See application file for complete search history.

(56) References Cited

U.S. PATENT DOCUMENTS 6,771,644 B1    8/2004  Brassil et al.
7,002,993 B1    2/2006  Mohaban et al.
(Continued)

FOREIGN PATENT DOCUMENTS

KR    1020070033322 A    3/2007
KR      100937045 B1    1/2010
(Continued)

OTHER PUBLICATIONS

Understanding timelines within MPEG Standards; Yuste; et al; 2016; (Year: 2016).*

(Continued)

*Primary Examiner* — Luis Perez-Fuentes
(74) *Attorney, Agent, or Firm* — William Park & Associates Ltd.

(57) ABSTRACT

The present invention provides a MMT transport packet structure and a method and an apparatus configuring the structure. A method of configuring an MPEG Media Transport (MMT) transport packet for transmitting an MMT payload format, the method comprising: configuring the MMT transport packet so that the MMT transport packet includes at least one MMT payload format unit and a sequence number field for a packet stream, wherein the sequence number field maintains consistency with a sequence number field included in the MMT payload format.

11 Claims, 2 Drawing Sheets

Related U.S. Application Data continuation of application No. 13/651,059, filed on Oct. 12, 2012, now Pat. No. 9,319,721.

(51) Int. Cl.
  *H04L 12/46* (2006.01)
  *H04L 29/08* (2006.01)
  *H04L 29/06* (2006.01)
  *H04N 21/472* (2011.01)
  *H04N 21/845* (2011.01)
  *H04L 12/58* (2006.01)
  *H04N 21/643* (2011.01)
  *H04N 21/6437* (2011.01)

(52) U.S. Cl.
  CPC .......... *H04L 12/4633* (2013.01); *H04L 51/38* (2013.01); *H04L 65/1016* (2013.01); *H04L 65/608* (2013.01); *H04L 67/06* (2013.01); *H04N 21/236* (2013.01); *H04N 21/47217* (2013.01); *H04N 21/6437* (2013.01); *H04N 21/64322* (2013.01); *H04N 21/8455* (2013.01)

(56) References Cited

U.S. PATENT DOCUMENTS

| | | | |
|---|---|---|---|
| 7,308,101 B2* | 12/2007 | Wing | H04L 29/06027 370/352 |
| 7,653,055 B2 | 1/2010 | Guo et al. | |
| 7,876,704 B1 | 1/2011 | Bims et al. | |
| 7,983,256 B2 | 7/2011 | Kimura et al. | |
| 8,032,164 B2 | 10/2011 | Aghili et al. | |
| 8,045,843 B2 | 10/2011 | Kim et al. | |
| 8,090,857 B2 | 1/2012 | Yonge et al. | |
| 8,375,277 B2 | 2/2013 | Koster et al. | |
| 8,386,630 B1 | 2/2013 | Atzmon | |
| 8,516,529 B2 | 8/2013 | LaJoie et al. | |
| 8,929,441 B2* | 1/2015 | Ma | H04N 21/44209 375/240.1 |
| 9,036,630 B2 | 5/2015 | Hwang et al. | |
| 9,319,721 B2* | 4/2016 | Bae | H04N 21/236 |
| 9,414,123 B2* | 8/2016 | Yie | H04H 20/18 |
| 9,473,378 B1 | 10/2016 | Bae | |
| 9,544,641 B2* | 1/2017 | Yie | H04N 21/2362 |
| 9,967,582 B2* | 5/2018 | Yie | H04N 21/234 |
| 2002/0023270 A1 | 2/2002 | Thomas et al. | |
| 2003/0108030 A1 | 6/2003 | Gao | |
| 2003/0135635 A1 | 7/2003 | Levi et al. | |
| 2004/0153360 A1 | 8/2004 | Schumann | |
| 2005/0223034 A1 | 10/2005 | Kaneko et al. | |
| 2007/0053374 A1 | 3/2007 | Levi | |
| 2008/0279181 A1 | 11/2008 | Shake et al. | |
| 2008/0304757 A1 | 12/2008 | Chen et al. | |
| 2009/0003389 A1 | 1/2009 | Joung et al. | |
| 2009/0122753 A1 | 5/2009 | Hughes et al. | |
| 2010/0141738 A1 | 6/2010 | Lee et al. | |
| 2010/0153827 A1 | 6/2010 | Koster et al. | |
| 2011/0255558 A1 | 10/2011 | Hwang et al. | |
| 2011/0293021 A1 | 12/2011 | Kotalwar et al. | |
| 2011/0320669 A1 | 12/2011 | Scandurra et al. | |
| 2012/0253826 A1 | 10/2012 | Kitazato et al. | |
| 2012/0294586 A1 | 11/2012 | Weaver et al. | |
| 2012/0317461 A1 | 12/2012 | Hwang et al. | |
| 2012/0324521 A1 | 12/2012 | Rhyu et al. | |
| 2013/0086213 A1 | 4/2013 | Rhyu et al. | |
| 2013/0094563 A1* | 4/2013 | Bae | H04N 21/236 375/240.01 |
| 2013/0305304 A1 | 11/2013 | Hwang et al. | |
| 2014/0133489 A1 | 5/2014 | Bae | |
| 2015/0131455 A1* | 5/2015 | Bae | H04N 19/89 370/242 |
| 2015/0296231 A1* | 10/2015 | Kwon | H04N 21/2362 725/116 |
| 2016/0198201 A1* | 7/2016 | Bae | H04N 21/236 375/240.01 |
| 2016/0294661 A1 | 10/2016 | Bae | |

FOREIGN PATENT DOCUMENTS

| | | |
|---|---|---|
| KR | 1020100033447 A | 3/2010 |
| WO | 2012099423 A2 | 7/2012 |

OTHER PUBLICATIONS

Google Search for NPL; 2019. (Year: 2019).*
Working Draft of MPEG Media Transport—Park, Gerard; 2011 (Year: 2011).*
NPL Google Search; 2019 (Year: 2019).*
Google patent search history log.
Google Search for NPL.
Stefano Battista et al., "MPEG-4: A Multimedia Standard for the Third Millennium, Part 1," MultiMedia, IEEE, Oct.-Dec. 1999, pp. 74-83, vol. 6, Issue 4, IEEE.
Working Draft of MPEG Media Transport—Park, Fernando.
Yuste et al., "Understanding Timelines Within MPEG Standards", IEEE Communications Surveys & Tutorials, vol. 18, No. 1, First Quarter 2016, IEEE, Oct. 7, 2015.

* cited by examiner

METHOD OF CONFIGURING AND TRANSMITTING AN MMT TRANSPORT PACKET

The present application is a Continuation of U.S. application Ser. No. 15/069,549, filed on Mar. 14, 2016, which is a Continuation of U.S. application Ser. No. 13/651,059, filed on Oct. 12, 2012, and the present application claims priority to Korean patent application number 10-2011-0104858 filed on Oct. 13, 2011 and 10-2012-0113533 filed on Oct. 12, 2012, the entire disclosure of which is incorporated by reference herein, is claimed.

BACKGROUND OF THE INVENTION

Field of the Invention

The present invention relates to an MPEG Media Transport (MMT) transport packet and, more particularly, to a method and apparatus for configuring or transmitting an MMT transport packet.

Discussion of the Related Art

A conventional media fragment header is not a part that is processed by a system, but a part that is accessed and processed by a media encoder. If the media fragment header has a complicated structure, there are problems in that it is difficult to embody the media fragment header and the availability of the media fragment header is deteriorated.

Korean Patent Registration No. 0965881 (called Cited Invention 1) discloses a system for encoding video data and a system for decoding video data. A video data encoding apparatus according to Cited Invention 1 includes a first encoding unit for generating a first bit stream by encoding input video data according to a specific syntax; a second encoding unit for generating a second bit stream by encoding the input video data according to a syntax different from the specific syntax; and a header information generation unit for receiving the first bit stream or the second bit stream and including header information, including syntax type information indicating that the first bit stream or the second bit stream is a bit stream encoded according to what syntax, in the first bit stream or the second bit stream. In accordance with Cited Invention 1, video data can be encoded and decoded independently using different encoding methods and can be subject to scalable encoding and scalable decoding using both the different encoding methods. The cited invention 1 is problematic in that it includes information on the type of data stream, information on the type of layer, and information on the type of scalability, but does not include information on random access and an Access Unit (AU).

In addition, U.S. Patent No. 2010-0021142 (called Cited Invention 2), entitled "MOVING PICTURE DECODING DEVICE, SEMICONDUCTOR DEVICE, VIDEO DEVICE, AND MOVING PICTURE DECODING METHOD" related to an apparatus and method for encoding and decoding media, and U.S. Patent Laid-Open Publication No. 2008-0260041 (called Cited Invention 3), entitled "ADVANCE MACRO-BLOCK ENTROPY CODING FOR ADVANCED VIDEO STANDARD" related to an apparatus for encoding video in a video standard, have been disclosed, but they do not disclose a method of transmitting and receiving information related to random access and an AU without depending on specific media or a specific codec.

SUMMARY OF THE INVENTION

The present invention provides a MMT transport packet structure and a method and an apparatus configuring the structure.

In an aspect, a method of configuring an MPEG Media Transport (MMT) transport packet for transmitting an MMT payload format comprises configuring the MMT transport packet so that the MMT transport packet includes at least one MMT payload format unit and a sequence number field for a packet stream, wherein the sequence number field maintains consistency with a sequence number field included in the MMT payload format.

In another aspect, a method of transmitting an MPEG Media Transport (MMT) transport packet for transmitting an MMT payload format comprises configuring the MMT transport packet so that the MMT transport packet includes at least one MMT payload format unit and a sequence number field for a packet stream and transmitting the configured MMT transport packet, wherein the sequence number field maintains consistency with a sequence number field included in the MMT payload format.

In yet another aspect, a MPEG Media Transport (MMT) transport packet comprises a header part and at least one Media Fragment Unit (MFU), wherein the MFU comprises at least one MMT payload format unit, the header part comprises a sequence number field for a packet stream, and the sequence number field maintains consistency with a sequence number field included in the MMT payload format.

An object of the present invention is to provide a new MMT transport packet structure and a method and apparatus for configuring the structure.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

DETAILED DESCRIPTION OF THE EMBODIMENTS

Figure 1:
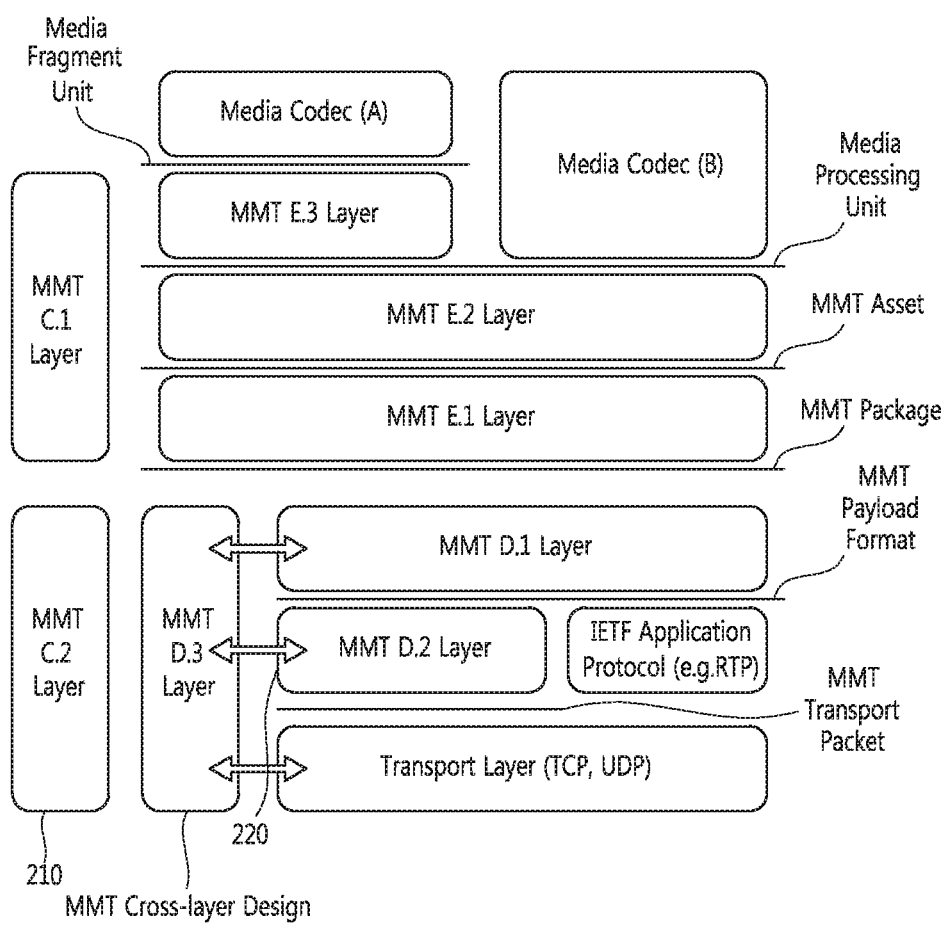
FIG. 1 is a conceptual diagram showing an MMT layer structure.

Hereinafter, some embodiments of the present invention are described in detail with reference to the accompanying drawings in order for those skilled in the art to be able to readily implement the invention. It is to be noted the present invention is not limited to the following embodiments and may be embodied in various forms. Furthermore, parts not related to the present invention are omitted in order to clarify the present invention in the drawings, and the same or similar reference numerals are used to denote the same or similar functions throughout the drawings.

First, the meanings of terms used in this specification are defined as follows.

A content component or a media component is defined as media of a single type or a subset of the media of a single type, and it may become, for example, a video track, movie subtitles, or an enhancement layer of video.

Content is defined as a set of content components, and it may become, for example, a movie or a song.

Presentation is defined as an operation that is performed by one or more devices so that a user can experience (e.g., watching movies) one content component or one service.

Service is defined as one or more content components that are transmitted for presentation or storage.

Service information is defined as meta data that describes one service and the characteristics and components of the service.

An Access Unit (AU) is the smallest data entity, and it may have time information as an attribute.

If an AU is related to coded media data for which time information for decoding and presentation has not been designated, the AU is not defined.

An MMT asset is a logical data entity that is formed into at least one MMT Processing Unit (MPU) along with the same MMT asset ID or formed of a lump of specific data along with a format defined in another standard.

The MMT asset is the largest data unit to which the same composition information and transport characteristics are applied.

An MMT Asset Delivery Characteristics (MMT-ADC) is a description related to QoS requirements for transmitting MMT assets. The MMT-ADC is presented so that a specific delivery environment cannot be known.

MMT Composition Information (MMT CI) describes a spatial and temporal relationship between MMT assets.

A Media Fragment Unit (MFU) is a general container and is independent for any specific codec. The MFU accommodates coded media data which can be independently consumed by a media decoder. The MFU has a size smaller than or larger than an Access Unit (AU) and accommodates information that may be used in a transport layer.

An MMT package is a set of logically structured data, and it includes at least one MMT asset, MMT-composition information, and MMT-asset delivery characteristics and explanatory information.

An MMT packet is the format of data that is generated or consumed by an MMT protocol.

An MMT payload format is a format for the payload of an MMT package or MMT signaling message that will be transmitted by an MMT protocol or an Internet application layer protocol (e.g., RTP).

An MMT Processing Unit (MPU) is a general container that is independent for any specific media codec, and it accommodates one or more AUs and information related to additional transmission and consumption. For non-timed data, an MPU accommodates the part of data that does not belong to an AU range. An MPU is coded media data that is full and can be independently processed. In this connection, processing means encapsulation or packetization as an MMT package for transmission.

Non-timed data defines all data elements which can be consumed without specifying the time. Non-timed data may have a time range in which data can be executed or started.

Timed data defines a data element that is related to a specific decoded and presented time.

FIG. 1 is a conceptual diagram showing an MMT layer structure.

Referring to FIG. 1, an MMT layer includes an Encapsulation layer (E-layer), a delivery layer, and an S layer. The MMT layer operates over a transport layer.

The E-layer may be responsible for, for example, the packetization, fragmentation, synchronized, and multiplexing functions of transmitted media.

An encapsulation functional area defines the logical structures of media content, an MMT package, and the formats of data units to be processed by an entity that complies with MMT. In order to provide information essential for adaptive transmission, an MMT package specifies components, including media content, and a relationship between the components. The formats of the data units is defined to encapsulate coded media so that the coded media is stored and transmitted in the payload of a transport protocol and can be easily converted between them.

The E-layer may include an MMT E.1 layer, an MMT E.2 layer, and an MMT E.3 layer, as shown in FIG. 1.

The MMT E.3 layer generates a Media Processing Unit (MPU) by encapsulating a Media Fragment Unit (MFU) provided by a media codec (A) layer.

Coded media data from a higher layer is encapsulated into an MFU. The type and value of coded media may be abstracted so that an MFU can be commonly used in a specific codec technique. In this case, the MFU can be processed without accessing coded media whose lower layer has been encapsulated. A lower layer fetches requested coded media data from a network or the buffer of a depository and sends the coded media data to a media decoder. AN MFU has a sufficient information media part unit for performing the above operation.

The MFU may have a format that is independent to a specific codec and on which a data unit that can be independently consumed in a media decoder may be loaded. An MFU may become, for example, a picture or slice of video.

A plurality of MFUs which form one or more groups and which can be transmitted and decoded independently generates an MPU. Non-timed media which can be transmitted and decoded independently generates an MPU. The MPU describes the same internal structure as that of the arrangement and pattern of an MFU that enables rapid access to an MFU and the partial consumption of the MFU.

The E.2 layer generates an MMT asset by encapsulating the MPU generated in the E.3 layer.

An MMT asset is a data entity including one MPU or a plurality of MPUs from a single data source and is a data unit in which Composition Information (CI) and Transport Characteristics (TCs) are defined. The MMT assess is multiplexed by the MMT payload format and transmitted by the MMT protocol. The MMT asset may correspond to Packetized Elementary Streams (PESs) and may correspond to, for example, video, audio, program information, an MPEG-U widget, an JPEG image, an MPEG 4 file format, and an MPEG transport stream (M2TS).

The E.1 layer generates an MMT package by encapsulating the MMT asset generated in the E.2 layer.

The MMT asset is packaged with MMT-Composition Information (MMT-CI) for the purpose of a subsequent response of the same user experience along with other functional areas (i.e., a transport area and a signal area) or separately from the functional areas. An MMT package is also packaged with transport characteristics for selecting a proper transmission method for each MMT asset so that the effective quality of the MMT asset is satisfied.

The MMT package may be formed of one MMT asset or a plurality of MMT assets along with pieces of supplementary information, such as composition information and transport characteristics. The composition information includes information on a relationship between the MMT assets and may further include information on a relationship between a plurality of MMT packages if a piece of content includes the plurality of MMT packages. The transport characteristics may include transport characteristic information that is necessary to determine a delivery condition on the MMT asset or the MMT packet and may include, for example, a traffic description parameter and a QoS descriptor. The MMT package may correspond to the program of an MPEG-2 TS.

The delivery layer may perform the network media multiplexing, network packetization, and QoS control of media that is transmitted, for example, over a network.

The delivery function area defines the application layer protocol and format of a payload. In the present invention, the application layer protocol provides a characteristic in which the transfer of an MMT package is more enhanced than a conventional application layer protocol for the transmission of multimedia including multiplexing. The payload format is defined to transfer coded media data irrespective of the type of media or an encoding method.

The Delivery layer (D-layer) may include an MMT D.1 layer, an MMT D.2 layer, and an MMT D.3 layer, as shown in FIG. 1.

The D.1 layer receives the MMT package generated from the E.1 layer and generates an MMT payload format based on the received MMT package. The MMT payload format is a payload format for transmitting an MMT asset and for transmitting information on the consumption of an MMT application protocol or the existing application transport protocol, such as an RTP. The MMT payload may include the fragments of an MFU along with information, such as an AL-FEC.

The D.2 layer receives the MMT payload format generated in the D.1 layer and generates an MMT packet based on the received MMT payload format. An MMT transport packet or an MMT packet is a data format that is used in the application transport protocol for MMT.

The D.3 layer supports QoS by providing a function of exchanging pieces of information between layers through the cross-layer design. For example, the D.3 layer can perform QoS control using the QoS parameters of the MAC/PHY layers.

The S layer performs a signaling function. For example, the S layer can perform signaling functions, such as the session initialization/control/management, trick mode based on a server and/or a client, service discovery, and synchronized of transmitted media.

The signaling functional area defines the formats of messages that manage the transfer and consumption of an MMT package. The message for consumption management is used to transmit the structure of an MMT package, and the message for transfer management is used to transmit the structure of a payload format and the configuration of a protocol.

The S layer may include an MMT S.1 layer and an MMT S.2 layer, as shown in FIG. 1.

The S.1 layer can perform service discovery, the media session initialization/termination of media, the media session presentation/control of media, and an interface function with the delivery layer (D-layer) and the encapsulation layer (E-layer). The S.1 layer may define the formats of control messages between applications for media presentation session management.

The S.2 layer may define the formats of control messages that are exchanged between the delivery end-points of the delivery layer (D-layer) regarding flow control, delivery session management, delivery session monitoring, error control, and hybrid network synchronized control.

The S.2 layer may include the establishment and release of a delivery session in order to support the operation of the delivery layer, the monitoring of a delivery session, flow control, error control, the scheduling of resources for an established delivery session, signaling for synchronized in a complicated delivery environment, and signaling for adaptive delivery. The S.2 layer may provide signaling necessary between a sender and a receiver. That is, the S.2 layer may provide signaling necessary between a sender and a receiver in order to support the above-described operations of the delivery layer. Furthermore, the S.2 layer may be responsible for an interface function with the delivery layer and the encapsulation layer.

Figure 2:
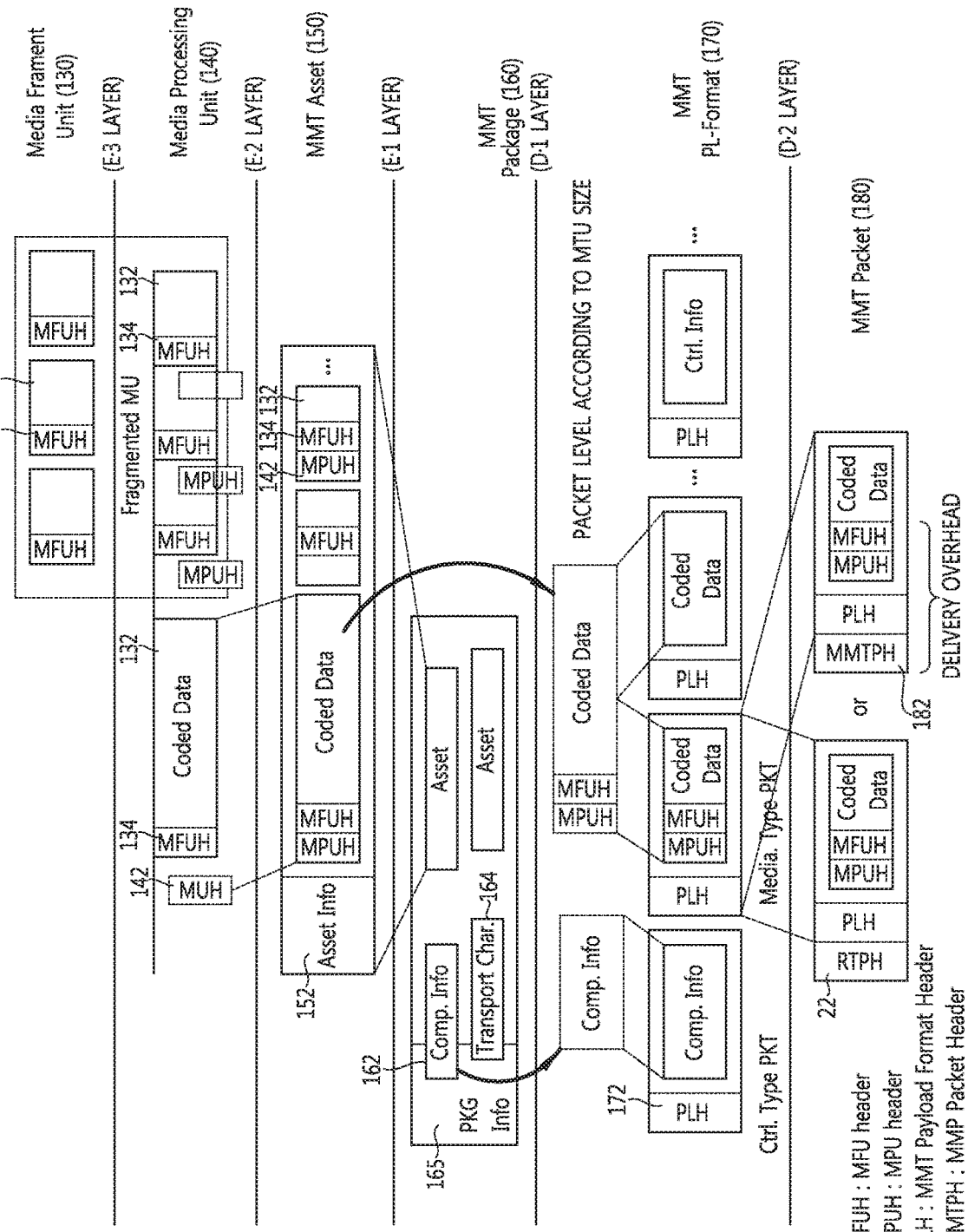
FIG. 2 is a conceptual diagram showing the format of unit information (or data or packet) that is used in each layer of the MMT layer structure.

FIG. 2 is a conceptual diagram showing the format of unit information (or data or packet) that is used in each layer of the MMT layer structure.

A Media Fragment Unit (MFU) 130 may include coded media fragment data 132 and a Media Fragment Unit Header (MFUH) 134. The MFU 130 has a general container format that is independent to a specific codec and can load the smallest data unit that can be independently consumed in a media decoder. The MFUH 134 may include supplementary information, such as media characteristics, for example, loss tolerance. The MFU 130 may become, for example, a picture or slice of video.

The Media Fragment Unit (MFU) may define a format that encapsulates the part of an AU in the transport layer in order to perform adaptive transmission in a range of the MFU. The MFU may be used to transmit a specific format of coded media so that the part of the AU can be decoded or discarded independently.

The MFU has an identifier for distinguishing it from other MFUs and may have information on a general relationship between MFUs within a single AU. A dependent relationship between the MFUs in a single AU may be described, and priority related to the MFU may be described as part of pieces of information. The information may be used to handle transmission in the underlying transport layer. For example, the transport layer may omit the transmission of MFUs that may be discarded so that QoS transmission in an insufficient bandwidth is supported. The structure of the MFU is described later.

An MPU is a set of MFUs including a plurality of the MFUs 130. The MPU may have a general container format that is independent to a specific codec and may include media data equivalent to an access unit. The MPU may have a timed data unit or a non-timed data unit.

The MPU is data that has been processed independently and fully by an entity that complies with MMT. The processing may include encapsulation and packetization. The MPU may include at least one MFU or may include part of data that has a format defined by another standard.

A single MPU can accommodate an integral number or non-timed data of one or more Aus. For timed data, an AU may be transferred from at least one MFU, but one AU cannot be fragmented into a plurality of MPUs. In non-timed data, one MPU accommodates part of non-timed data that has been processed independently and fully by an entity that complies with MMT.

The MPU is a sequence number and an associated asset ID that distinguishes it from other MPUs and can be uniquely identified within an MMT package.

The MPU may have at least one access point. The first byte of an MPU payload may always be started from a specific access point. In timed data, the above fact means that the decoding sequence of the MFU is always 0 in the MPU payload. In timed data, the presentation duration and decoding sequence of each AU may be transmitted in order to inform the presentation time. The MPU does not have its own initial presentation time, and the presentation time of the first AU of one MPU may be described in composition information. The composition information may state the first presentation time of the MPU. This is described in detail later.

An MMT asset 150 is a set of MPUs. The MMT asset 150 is a data entity including a plurality of MPUs (timed or non-timed) data) from a single data source. The MMT asset 150 may include asset packaging metadata and supplementary information, such as a data type. The MMT asset 150 may include, for example, video, audio, program information, an MPEG-U widget, a JPEG image, an MPEG 4 File Format (FF), Packetized Elementary Streams (PESs), and an MPEG transport stream (M2TS).

The MMT asset 150 is a logical data entity that accommodates coded media data. The MMT asset 150 may include an MMT asset header and coded media data. The coded media data may become a collective reference group of MPUs having the same MMT asset ID. Data of a type that can be individually consumed by an entity directly connected to an MMT client may be considered as an individual MMT asset. The data type that may be considered as an individual MMT asset may include, for example, an MPEG-2 TS, a PES, an MP4 file, an MPEG-U widget package, and a JPEG file.

The coded media of the MMT asset 150 may be timed data or non-timed data. The timed data is sight and hearing media data that requires the synchronized decoding and presentation of specific data on a designated time. The non-timed data is data of a data type that can be decoded and provided on a specific time depending on the supply of service or a user interaction.

A service provider can generate multimedia service by integrating MMT assets in the state in which the MMT assets are placed on the space-time axis.

An MMT package 160 is a set of MMT assets including one or more of the MMT assets 150. The MMT assets within the MMT package 160 may be multiplexed or concatenated like a chain.

The MMT package 160 is a container format for an MMT asset and configuration information. The MMT package provides the depository of the MMT asset and the configuration information for MMT program.

An MMT program provider encapsulates coded data into MMT assets and describes the MMT assets and the temporal and spatial layout of the transport characteristics of the MMT assets. The MMT program provider generates configuration information. An MU and an MMT asset may be directly transmitted according to the D.1 payload format. The configuration information may be transmitted through a C.1 presentation session management message. However, an MMT program provider and a client which permit the relay of an MMT program or subsequent reuse store the configuration information in an MMT package format.

In parsing an MMT package, an MMT program provider determines whether an MMT asset will be provided to a client through what path (e.g., broadcast or broadband). Configuration information in an MMT package is transmitted through the C.1 presentation session management message along with information related to transmission.

A client receives the C.1 presentation session management message and knows that what MMT program is possible and how the MMT asset for the MMT program is received based on the received C.1 presentation session management message.

An MMT package may also be transmitted according to the D.1 payload format. The MMT package is packetized and transmitted in the D.1 payload format. A client receives a packetized MMT package, configures all or part of the packetized MMT package, and consumes an MMT program in the configured MMT package.

Package information 165 on the MMT package 160 may include configuration information. The configuration information may include a list of MMT assets, package identification information, composition information 162 and supplementary information, such as transport characteristics 164. The composition information 162 includes information on a relationship between the MMT assets 150.

The composition information 162 may further include information on a relationship between a plurality of MMT packages if a piece of content includes the plurality of MMT packages. The composition information 162 may include information on a temporal, spatial, and adaptive relationship within the MMT packages.

Like information that helps the transmission and presentation of an MMT package, composition information in MMT provides information on a spatial and temporal relationship between MMT assets within the MMT package.

An MMT-CI is a descriptive language that extends HTML5 and provides information on the extension. If the HTML5 has been designed so that it describes the page-based presentation of content based on text, the MMT-CI basically presents a spatial relationship between sources. In order to support presentation that informs a temporal relationship between MMT assets, the MMT-CI may be extended so that it includes information related to MMT assets within an MMT package like presentation resources, time information that determines the transmission and consumption sequence of the MMT assets, and the additional attributes of media elements that consume a variety of MMT assets in HTML5.

The transport characteristics information 164 includes information on transport characteristics and can provide information necessary to determine a delivery condition on each MMT asset (or an MMT packet). The information on the transport characteristics may include a traffic description parameter and a QoS descriptor.

The traffic description parameter may include information on the bit rate of the MFU 130 or the MPU and information on priority. The information on the bit rate may include, for example, information on whether an MMT asset has a Variable Bit Rate (VBR) or a Constant Bit Rate (CBR), a bit rate guaranteed for an MFU (or MPU), and a maximum bit rate for an MFU (or MPU). The traffic description parameter may be used for resource reservation between a server, a client, and other elements on a delivery path. The traffic description parameter may include, for example, information on a maximum size of an MFU (or MPU) within an MMT asset. The traffic description parameter may be updated periodically or aperiodically.

The QoS descriptor includes information for QoS control and may include, for example, delay information and loss information. The loss information may include, for example, a loss indicator about whether the delivery loss of an MMT asset has been permitted or not. For example, when the loss indicator is '1', it may indicate 'lossless'. If the loss indicator is '0', it may indicate 'loss'. The delay information may include a delay indicator that is used to distinguish sensitivities in the delivery delay of MMT assets. The delay indicator may indicate whether the type of MMT asset is conversation, interactive, real time, or non-real-time or not.

A piece of content may include one MMT package or a plurality of MMT packages.

If a piece of content includes a plurality of MMT packages, composition information or configuration information indicative of a temporal, spatial, and adaptive relationship between the plurality of MMT packages may be placed within one of the MMT packages or may be placed outside the MMT packages.

For example, in the case of hybrid delivery, some of content components may be transmitted over a broadcast network, and the remaining content components may be transmitted over a broadband network. For example, in the case of a plurality of AV streams forming one multi-view service, one stream may be transmitted over a broadcast network, and the remaining streams may be transmitted over a broadband network. The AV streams may be multiplexed, received individually by a client terminal, and stored therein. Alternatively, there is a scenario in which application software, such as a widget, is transmitted over a broadband network, and there is a scenario in which AV streams (AV program) is transmitted over a broadcast network.

In the case of the multi-view service scenario and/or the widget scenario, all AV streams may become one MMT package. In this case, one of all the AV streams may be stored in only one client terminal, storage content becomes part of an MMT package, the client terminal has to record composition information or configuration information again, and the recorded content becomes a new MMT package not related to a server.

In the case of the multi-view service scenario and/or the widget scenario, each of AV streams may become one MMT package. In this case, a plurality of MMT packages forms a piece of content, the MMT packages are recorded on storage for each MMT package, and there is a need for composition information or configuration information indicative of a relationship between MMT packages.

Composition information or configuration information included in one MMT package may refer to an MMT asset within another MMT package and may present the outside of an MMT package that refers to an MMT package in an out-band situation.

Meanwhile, in order to inform a client terminal of a list of the MMT assets 150 provided by a service provider and a possible path for the delivery of the MMT package 160, the MMT package 160 is translated into service discovery information through a control (C) layer, and an MMT control message may include an information table for service discovery.

A server segments multi-media content into a plurality of segment, allocates pieces of URL information to the plurality of segments segmented into a specific number, stores the pieces of URL information on the respective segments in a media information file, and sends the media information file to a client.

The media information file may be called a variety of names, such as 'Media Presentation Description (MPD)' or a 'manifest file' depending on a standardization organization for standardizing HTTP streaming. The media information file is hereinafter called the MPD.

A Cross-Layer Interface (CLI) is described below.

The CLI is used to exchange pieces of information related to QoS between the application layer and a lower layer including the MAC/PHY layers, and it provides means for supporting QoS to a single entity. The lower layer provides information on bottom-up QoS, such as a network channel state, whereas the application layer provides information on media characteristics as information on top-down QoS.

The CLI provides an integrated interface between a variety of network layers, including the application layer and IEE802.11 WiFi, IEEE 802.16 WiMAX, 3G, and 4G LTE. The common network parameters of a popular network standard are extracted as NAM parameters for the static dynamic QoS control of a real-time media application over various networks. The NAM parameter may include a Bit Error Rate (BER) value. The BER may be measured in the PHY or MAC layer. Furthermore, the NAM value provides the ID of an underlying network, a possible bit rate, a buffer state, a peak bit rate, a service unit size, and a service data unit loss rate.

Two different methods may be used to provide the NAM value. The first method is to provide an absolute value, and the second method is to provide a relative value. The second method may be used to update the NAM value during access.

The application layer provides top-down QoS information that is related to media characteristics for a lower layer. There are two types of pieces of top-down information, such as MMT asset level information and packet level information. The MMT asset information is used for the exchange of capacities in a lower layer and/or for the (re)allocation of resources. The packet level top-down information is recorded on the proper fields of all packets for a lower layer so that a supported QoS level can be identified.

The lower layer provides the application layer with bottom-up QoS information. The lower layer provides information on a network state that varies over time and enables faster and more accurate QoS control in the application layer. The bottom-up information is presented in an abstracted form in order to support heterogeneous network environments. The parameters are measured in the lower layer and are read from the application layer periodically or at the request of an MMT application.

An MMT transport packet is responsible for the application layer for transmitting an MMT payload format through the transport protocol of an Internet Protocol (IP) network. The structure of an MMT transport packet according to the present invention is described below.

For example, in accordance with the present invention, one MMT transport packet may include one MMT payload format (or an MMT payload format unit). The aggregation or fragmentation of units according to an MMT Transport Unit (MTU) may be performed by an MMT payload format layer.

For another example, in accordance with the present invention, an MMT transport packet can accommodate an operation that is commonly applicable to the existing Real-time Transport Protocol (RTP) payload format.

The MMT payload format may be used as an RTP payload format over the RTP and may be used over the MMT transport packet at the same time. In an IP packet stream, a sequence number for a packet string, such as error check or recovery, is required. An RTP packet can support a sequence number field for the sequence number. Furthermore, if the MMT payload format is used over the RTP, the sequence number of the RTP may be used. Furthermore, if the MMT payload format is used over an MMT transport packet, the MMT transport packet may have a general sequence number field for a packet stream in order to maintain consistency with the case where the MMT payload format is used over the RTP.

Table 1 below shows an example of an MMT transport packet. Sequence of elements is not limited to that shown in Table 1, and the elements are not exclusive. The elements of Table 1 may include other elements or one or more of the elements shown in Table 1 may be deleted.

TABLE 1

| Syntax | No. of bits | Mnemonic |
|---|---|---|
| mmt_packet ( ){<br>  sequence_no<br>  mmt_payload_format ( )<br>} | 16 | |

In Table 1, sequence_no indicates the sequence number of a packet stream and increase by 1 per packet.

Two types of the greatest functions that are provided for media streaming when the RTP is used over a User Datagram Protocol (UDP) layer include a packet sequence number and a timestamp. The timestamp provides a Presentation Time Stamp (PTS)-equivalent function. In the MMT, the PTS may be provided by an E-layer function, more particularly, by an M-unit.

In accordance with the present invention, the packet sequence number is provided in MMT transmission. A general sequence number system for a packet stream can be supported at the same time when the MMT payload format is used over the RTP and the MMT payload format is used over the MMT transport packet.

In the above exemplary systems, although the methods have been described on the basis of the flowcharts using a series of the steps or blocks, the present invention is not limited to the sequence of the steps, and some of the steps may be performed in order different from that of the remaining steps or may be performed simultaneously with the remaining steps. Furthermore, those skilled in the art will understand that the steps shown in the flowcharts are not exclusive and they may include other steps or one or more steps of the flowchart may be deleted without affecting the scope of the present invention.

While some exemplary embodiments of the present invention have been described with reference to the accompanying drawings, those skilled in the art may change and modify the present invention in various ways without departing from the essential characteristic of the present invention. Accordingly, the disclosed embodiments should not be construed to limit the technical spirit of the present invention, but should be construed to illustrate the technical spirit of the present invention. The scope of the technical spirit of the present invention is not limited by the embodiments, and the scope of the present invention should be interpreted based on the following appended claims. Accordingly, the present invention should be construed to cover all modifications or variations induced from the meaning and scope of the appended claims and their equivalents.

What is claimed is:

1. An apparatus for generating MPEG Media Transport (MMT) packet structure by packetizing media data, the apparatus comprising:
    an encapsulation unit configured generate media processing unit (MPU) by encapsulating at least one media fragment unit (MFU), generate asset including at least one media processing unit and generate an MMT package at least one asset; and
    a packetization unit configured to generate the MMT packet structure by packetizing the media processing unit included in the asset,
    wherein the MPU includes at least one access point indicating information regarding decoding or presentation of access unit,
    wherein the packetization unit generates the MMT packet including a packet sequence number field counting the MMT packet transmitted, and
    wherein the MMT packet comprises a first MMT packet including composition information (CI) including information regarding spatial and temporal relationship between a plurality of assets.

2. The apparatus of claim 1, wherein the MMT packet further comprises a second MMT packet including the media processing unit separate out.

3. The apparatus of claim 1, wherein the MMT packet structure operates over a transport layer; and the operations for the MMT packet further comprising:
    an MPU Encapsulation, for performing packetization, fragmentation, and synchronization functions of transmitted media;
    a Delivery of MMT package, for performing management of transport flows, media multiplexing, error control, the scheduling for an delivery session, signaling for synchronization in a delivery environment; and
    a message Signaling, for signaling message for defining formats of message that manage a transfer and consumption of an MMT package, a presentation, control and management of the transmitted media, and synchronization of the transmitted media.

4. The apparatus of claim 1, wherein the asset comprises at least one MPU sharing the same MMT asset ID, and
    wherein the MPU is identified by the MMT asset ID and a MPU sequence number.

5. The apparatus of claim 1, wherein a value of the packet sequence number field is increased by 1 per the MMT packet transmitted.

6. The apparatus of claim 1, wherein the composition information includes temporal and spatial information regarding relationship between the plurality of assets.

7. A method for generating MPEG Media Transport (MMT) packet structure by packetizing media data, the method comprising:
    generating media processing unit (MPU) by encapsulating at least one media fragment unit (MFU), generate asset including at least one media processing unit and generate an MMT package at least one asset; and
    generating the MMT packet structure by packetizing the media processing unit included in the asset,
    wherein the MPU includes at least one access point indicating information regarding decoding or presentation of access unit,
    wherein the packetization unit generates the MMT packet including a packet sequence number field counting the MMT packet transmitted, and
    wherein the MMT packet comprises a first MMT packet including composition information (CI) including information regarding spatial and temporal relationship between a plurality of assets.

8. The method of claim 7, wherein the MMT packet further comprises a second MMT packet including the media processing unit separate out.

9. The method of claim 7, wherein the MMT packet structure operates over a transport layer; and the operations for the MMT packet further comprising:
    an MPU Encapsulation, for performing packetization, fragmentation, and synchronization functions of transmitted media;
    a Delivery of MMT package, for performing management of transport flows, media multiplexing, error control, the scheduling for an delivery session, signaling for synchronization in a delivery environment; and
    a message signaling, for signaling message for defining formats of message that manage a transfer and consumption of an MMT package, a presentation, control and management of the transmitted media, and synchronization of the transmitted media.

10. The method of claim 7, wherein the asset comprises at least one MPU sharing the same MMT asset ID, and
    wherein the MPU is identified by the MMT asset ID and a MPU sequence number.

11. The method of claim 7, wherein a value of the packet sequence number field is increased by 1 per the MMT packet transmitted.

* * * * *